(12) United States Patent
Hady et al.

(10) Patent No.: US 12,061,550 B2
(45) Date of Patent: Aug. 13, 2024

(54) COHERENT MULTIPROCESSING ENABLED COMPUTE IN STORAGE AND MEMORY

(71) Applicant: Intel Corporation, Santa Clara, CA (US)

(72) Inventors: Frank T. Hady, Portland, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 16/828,700

(22) Filed: Mar. 24, 2020

(65) Prior Publication Data

US 2020/0226067 A1 Jul. 16, 2020

(51) Int. Cl.
G06F 8/41 (2018.01)
G06F 12/0804 (2016.01)
G06F 12/0815 (2016.01)

(52) U.S. Cl.
CPC .......... G06F 12/0815 (2013.01); G06F 8/451 (2013.01); G06F 12/0804 (2013.01); G06F 2212/1016 (2013.01)

(58) Field of Classification Search
None
See application file for complete search history.

(56) References Cited

U.S. PATENT DOCUMENTS

| | | | | |
|---|---|---|---|---|
| 5,954,792 A * | 9/1999 | Balarin | ................. | G06F 9/4887 718/102 |
| 8,010,965 B2 * | 8/2011 | Keany | ................... | G06F 9/5027 714/1 |
| 10,936,369 B2 * | 3/2021 | Nguyen | ................. | G06F 9/5016 |
| 2002/0066086 A1 * | 5/2002 | Linden | ................ | G06F 9/45516 717/145 |
| 2006/0212440 A1 * | 9/2006 | Heishi | .................... | G06F 8/4442 |
| 2013/0155080 A1 * | 6/2013 | Nordlund | ............. | G06T 15/005 345/522 |
| 2013/0166826 A1 * | 6/2013 | Franceschini | ....... | G06F 12/0246 711/E12.008 |
| 2017/0075734 A1 * | 3/2017 | Raman | ................. | G06F 9/4881 |
| 2017/0192821 A1 * | 7/2017 | Ki | .......................... | G06F 9/5027 |
| 2017/0286301 A1 * | 10/2017 | Chang | .................. | G06F 12/084 |
| 2019/0042232 A1 | 2/2019 | Trika | | |
| 2019/0042501 A1 | 2/2019 | Trika | | |
| 2019/0042594 A1 | 2/2019 | Trika et al. | | |
| 2019/0114108 A1 | 4/2019 | Trika et al. | | |
| 2019/0114114 A1 | 4/2019 | Trika et al. | | |
| 2019/0196907 A1 | 6/2019 | Khan et al. | | |
| 2019/0258504 A1 | 8/2019 | Trika et al. | | |

(Continued)

OTHER PUBLICATIONS

Balasubramonian et al, "Near Data Processing: Insights from a Micro-46 Workshop", IEEE Micro, Jul./Aug. 2014, 7 pages.

(Continued)

*Primary Examiner* — Marina Lee
(74) *Attorney, Agent, or Firm* — Compass IP Law PC

(57) ABSTRACT

An apparatus is described. The apparatus includes a mass storage device processor that is to behave as an additional general purpose processing core of a computing system that a mass storage device having the mass storage device processor is to be coupled to, wherein, the mass storage device processor is to execute out of a component of main memory within the mass storage device.

8 Claims, 4 Drawing Sheets

(56) References Cited

U.S. PATENT DOCUMENTS

2023/0025917 A1* 1/2023 He ................. G06F 9/5066

OTHER PUBLICATIONS

Figure 1:
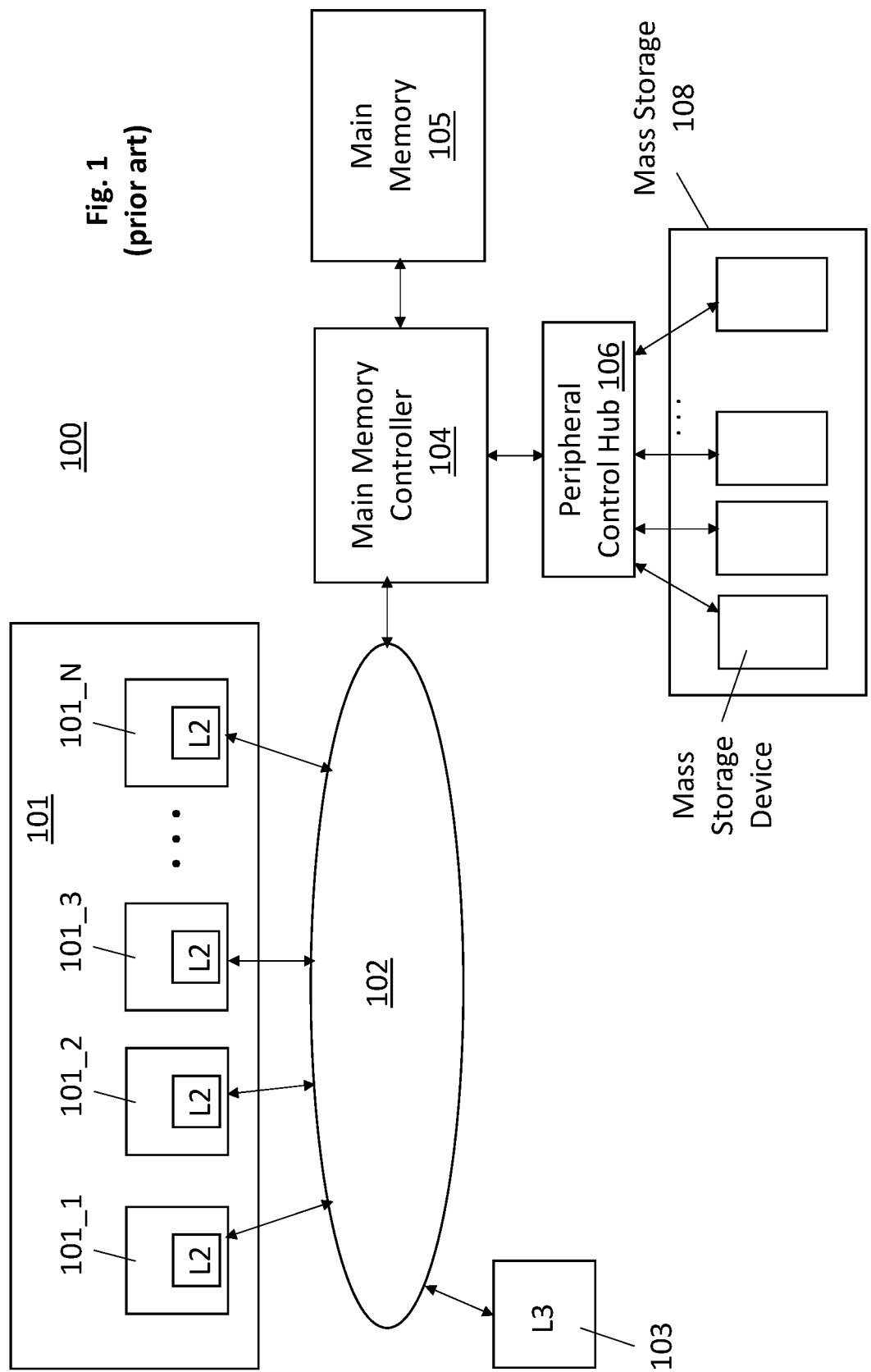

Bertschman, "Computational Storage using NVMe", Storage Visions, Oct. 2018, 10 pages.

Choi, et al, "Energy Efficient Scale-In Clusters with In-Storage Processing for Big-Data Analytics", MEMSYS, Conference Paper, Oct. 5-8, 2015, 10 pages.

Doller et al, "Near-memory Acceleration for Data-oriented Applications", 2014 IEEE Symposium on VLSI Circuits Digest of Technical Papers, 4 pages.

Doller, "Storage Architecture for the Datacenter in 2020", Flash Memory Summit 2013, 22 pages.

Gaysse, "A Comparison of In-Storage Processing Architectures and Technologies", SDC Sep. 24-27, 2018, Santa Clara, CA, 50 pages.

Gu et al, "Biscuit: A Framework for Near-Data Processing of Big Data Workloads", 2016 43rd Annual Symposium on Computer Architecture, 13 pages.

Jun et al, "BlueDBM: Distributed Flash Storage for Big Data Analytics", ACM Transactions on Computer Systems, vol. 34, No. 3, Jun. 11, 2016, 32 pages.

Jun et al, "Terabyte Sort on FPGA-Accelerated Flash Storage", 2017 IEEE 25th Annual International Symposium on Field-Programmable Custom Computing Machines (FCCM), , Apr. 30-May 2, 2017, 8 pages.

Kang, et al, "Enabling Cost-effective Data Processing with Smart SSD", 2013 IEEE 29th Symposium on Mass Storage Systems and Technologies (MSST), May 6-10, 2013, Long Beach, CA, 12 pages.

Koo et al, "Dynamic Near Data Processing Framework for SSDs", NVM Workshop, University of California—San Diego, Mar. 2018, 35 pages.

Koo et al, "Summarizer: Trading Communication with Computing Near Storage", IEEE/ACM International Symposium on Microarchitecture, Cambridge, MA, USA, Oct. 14-18, 2017, pp. 219-231.

Kulkarni, et al, "Splinter: Bare-Metal Extensions for Multi-TenantLow-Latency Storage", Proceedings of the 13th USENIX Symposium on Operating System Design and Implementation, Oct. 2018, pp. 627-643.

Lee et al, "ExtraV: Boosting Graph Processing Near Storage with a Coherent Accelerator", IBM Research, Seoul National University, Proceedings of the VLDB Endowment, vol. 10, No. 12, 2017, 12 pages.

Muthal, et al., "Platforms for the Adaptable Intelligent World",—Computational Storage Platform, Storage Visions, Oct. 23, 2018, 13 pages.

Park et al, "In-Storage Computing for Hadoop MapReduce Framework: Challenges and Possibilities", IEEE Transactions on Computers, vol. 66, , Jul. 2016, 15 pages.

Pei et al, "Registor: A Platform for Unstructured Data Processing Inside SSD Storage", University of Rhode Island and Shenzen DAPU Microelectronics Co. Ltd., ACM Trans. Storage 15, Article 7, Mar. 2019, 24 pages.

Salami et al, "AxleDB: A Novel Programmable Query Processing Platform on FPGA", Barcelona Supercomputing Center, Microprocessors and Microsystems 51 (2017), pp. 142-164.

Shadley, Scott, "Deployment of In-Storage Compute", SDC 18, Santa Clara, CA, Sep. 24-27, 2018, 29 bages.

Tang et al, "Data Movement Aware Computation Partitioning", Proceedings of MICRO 50, Cambridge, MA, USA, Oct. 14-18, 2017, 15 pages.

Tseng et al, "Morpheus: Creating Application Objects Efficiently for Heterogeneous Computing", 2016 ACM/IEEE 13rd Annual International Symposium on Computer Architecture, pp. 53-65.

Wang et al, "SSD In-Storage Computing for Search Engines." IEEE Transactions on Computers (TC), Sep. 2016, 14 pages.

Wang et al. "SSD In-Storage Computing for List Intersection", In Proceedings of the 12th International Workshop on Data Management on New Hardware, DaMON, in conjunction with SIGMOD, Jun. 27, 2016, 8 pages.

Yang, Seok Ki, "In-Storage Compute: an Ultimate Solution for Accelerating I/O-intensive Applications", FMS, Aug. 13, 2015, 30 pages.

Zaharia, Matei, Apache Spark—https://spark.apache.org, initial release May 26, 2014, downloaded from Wikipedia, Jul. 20, 2020, 8 pages.

Singh, G. et al., "A Review of Near-Memory Computing Architectures: Opportunities and Challenges," 2018 21st Euromicro Conference on Digital System Design (DSD), Prague, Czech Republic, doi: 10.1109/DSD.2018.00106, Date of Conference: Aug. 29-31, 2018, Date Published in IEEE: Oct. 14, 2018, pp. 608-617, 10 pages.

* cited by examiner

COHERENT MULTIPROCESSING ENABLED COMPUTE IN STORAGE AND MEMORY

FIELD OF INVENTION

The field of invention pertains generally to the computing sciences, and, more specifically, to coherent multiprocessing enabled compute in storage and memory.

BACKGROUND

With the advent of big-data, cloud computing, artificial intelligence and other numerically intensive computing system environments, performance is increasingly dependence on the ability to obtain and process data that is stored in non volatile mass storage. As such, computing system designers are continually seeking ways to improve the speed and/or versatility by which data stored in non volatile memory can be accessed and processed.

FIGURES

Figure 2:
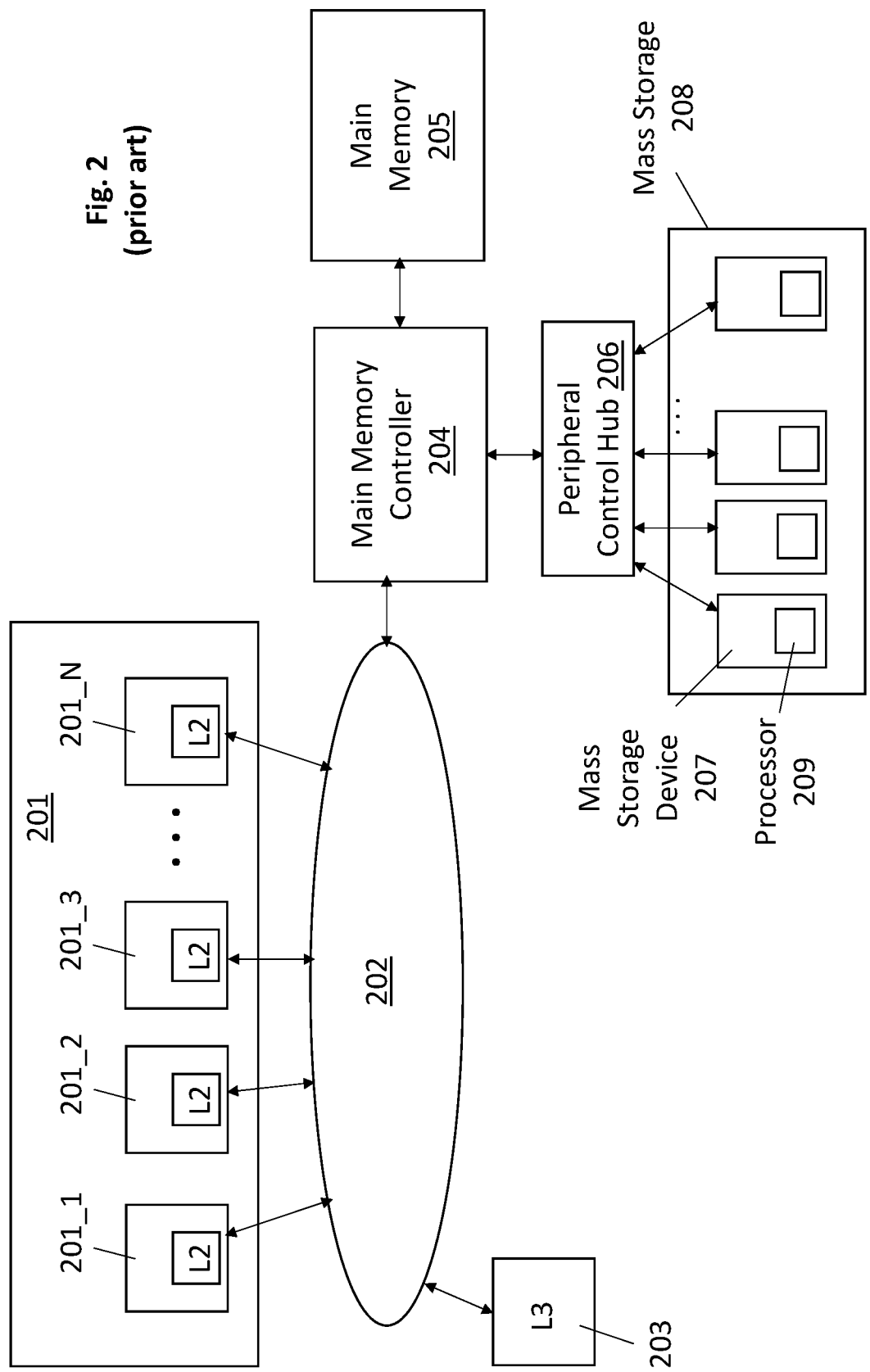
Figure 3:
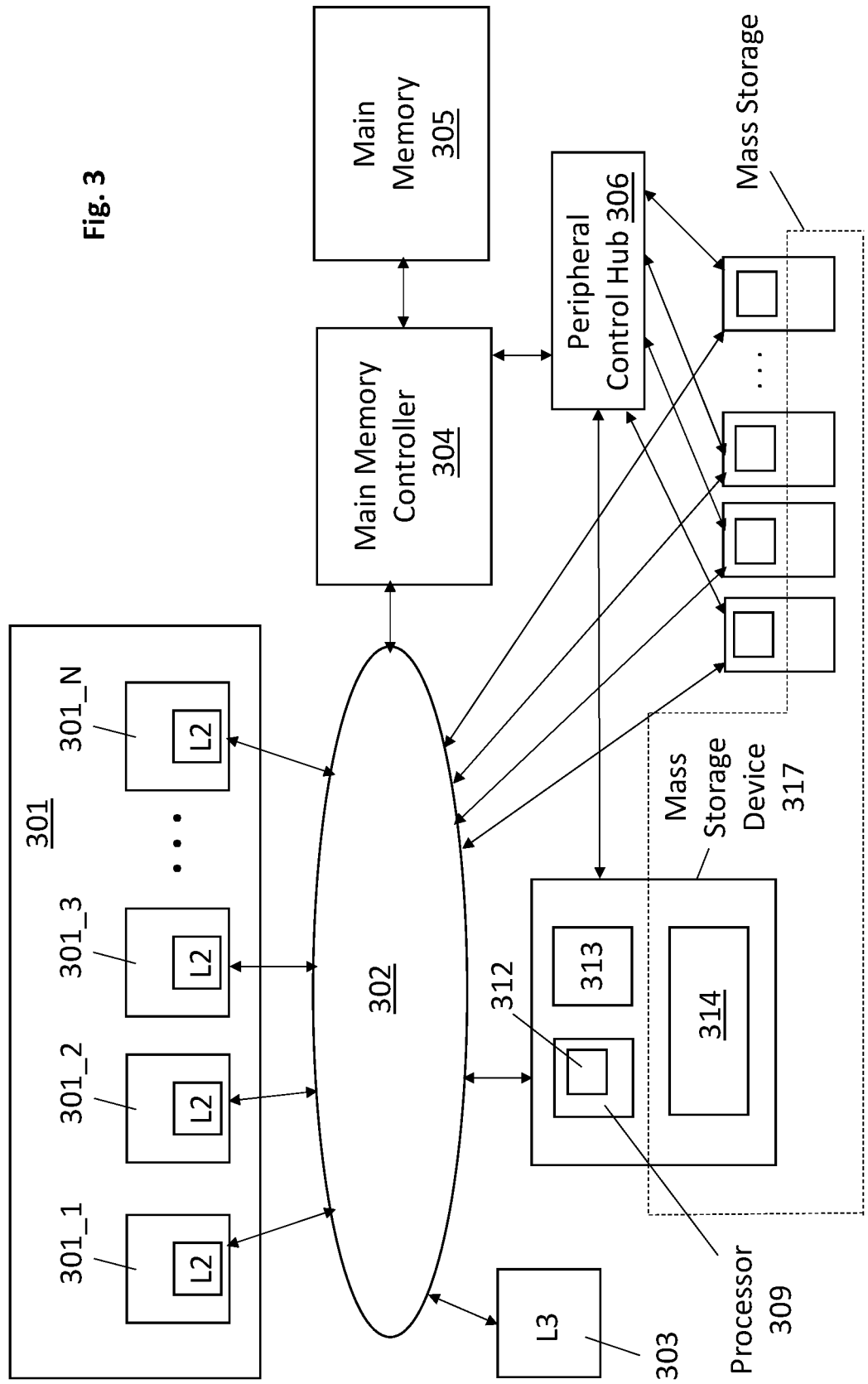
Figure 4:
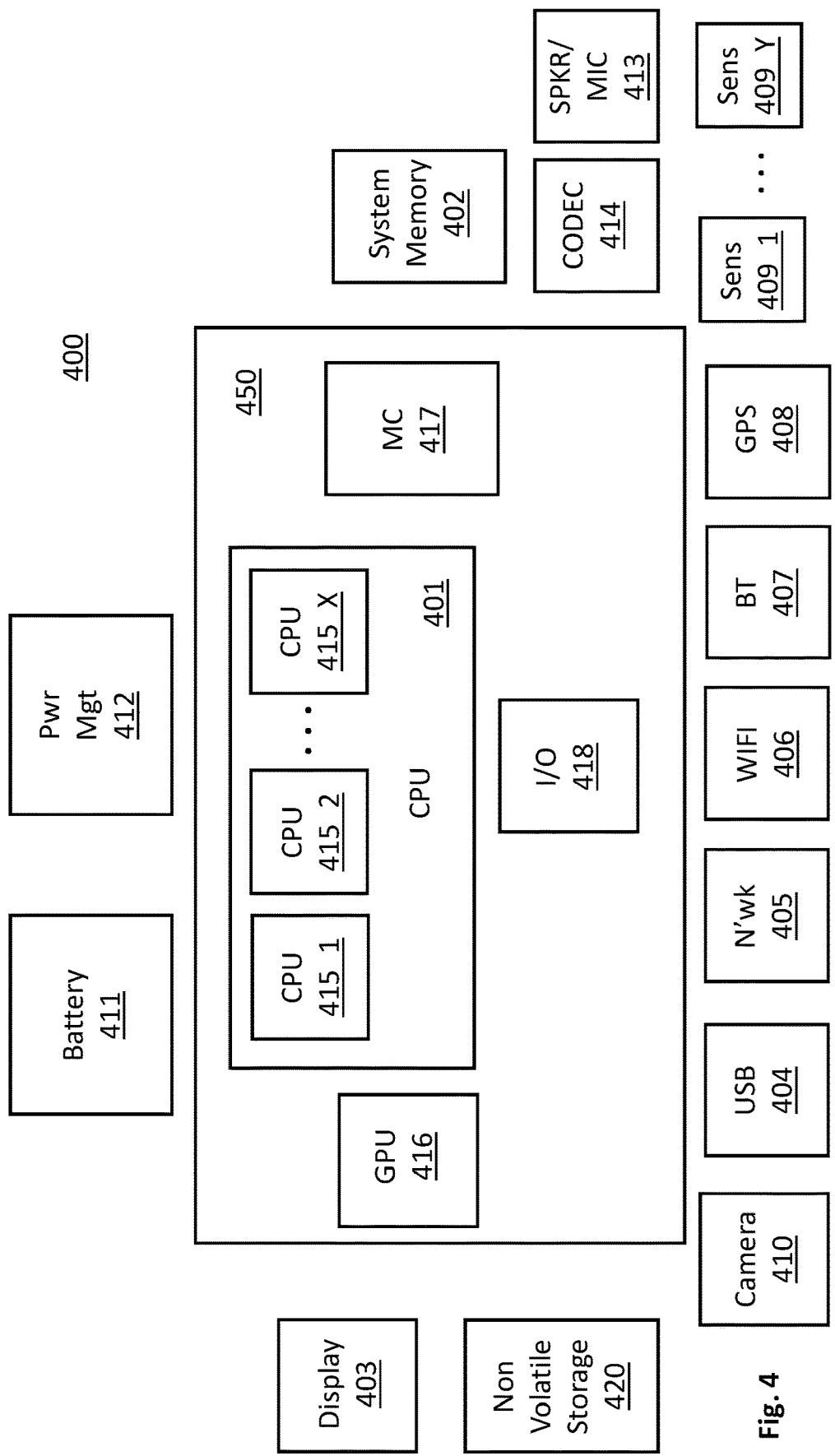

A better understanding of the present invention can be obtained from the following detailed description in conjunction with the following drawings, in which:

FIG. 1 shows a first prior art computing system;
FIG. 2 shows a second prior art computing system;
FIG. 3 shows an improved computing system;
FIG. 4 shows a computing system.

DETAILED DESCRIPTION

FIG. 1 shows a prior art computing system 100. As observed in FIG. 1, the prior art computing system 100 includes multiple general purpose processing cores 101. Each processing core includes multiple instruction execution pipelines and an L2 CPU cache to service its instruction execution pipelines (for ease of drawing, neither the instruction execution pipelines nor their respective L1 caches are depicted in FIG. 1). The general purpose processing cores 101 are also collectively coupled to an L3 cache 103 that services the general purpose cores 101.

If a software thread that is executing on any instruction pipeline of any processing core seeks access to a data item that is not in its local register space, it looks for the data item in the pipeline's dedicated L1 cache. If a miss results, the data item is next looked for in the pipeline's core's L2 cache. If a miss results, the data item is next looked for in the L3 cache 103. Some systems may have one or more additional CPU caches between the L3 cache 103 and system memory 105. If there is a miss in the L3 cache, the data item will be looked for in any other CPU caches that exist between the L3 cache and system in succession (for ease of drawing FIG. 1 does not depict any such caches).

Ultimately, if the data item is not found in any of the CPU caches a request is sent to the main memory controller 104 to access the data item from main memory 105. If the pipeline's need for the item corresponds to a read, the data item is fetched from main memory 105 and placed into the pipeline's local register space. If the need corresponds to a write, the search for the data item includes the new write data which is ultimately included in the request sent to the main memory controller 104. The main memory controller 104 then writes the new data over the data item in the main memory 105.

Importantly, the instruction execution pipelines of each of the processing cores 101_1 through 101_N share a common instruction set architecture (ISA). That is, the instruction execution pipelines respect the same/compatible set of instructions, the definition of these instructions and register structure and definition. So doing allows high-level source code to be readily compiled for execution on any of the pipelines of any of the cores 101_1 through 101_N. As such, for example, large and complex software programs can be broken down into smaller constituent components (threads), e.g., for parallel execution on different pipelines (and/or cores).

Notably, the different executing threads can compete for a same data item. That is, for example, a first thread executing on a first pipeline can desire access to a data item at approximately the same time that a second thread executing on another pipeline desires access to the same data item. Such threads can be executing on different ones of the processing cores 101_1 through 101_N.

A cache coherence protocol, such as the modified/exclusive/shared/invalid (MESI) protocol, is used to ensure that a data item will remain consistent even if different threads require access to the data item at approximately the same time. That is, for example, the cache coherence protocol prevents the occurrence of two or more threads receiving the same copy/value of a data item and then updating the copy/value with different changes (so doing would create two different "inconsistent" versions of the same data item). As such, the operation of the CPU caches in the system are supported with a cache coherence protocol to avoid data conflicts or other coherency issues. Here, any one of the processing cores 101_1 through 101_2 can access data over network 102 from at least the L2 cache of any other of the processing cores 101_1 through 101_2 or the L3 cache by executing the cache coherence protocol.

The presence of multiple pipelines/cores that share a common ISA supported by a cache coherence protocol allow for straightforward breakdown of software programs into smaller object code instances that can execute on any pipeline/core in the system.

An inefficiency in the traditional computing system of FIG. 1, however, is that the program code that is executing on the cores execute out of main memory 105 and not mass storage 108. Here, both program code instructions and data are kept in main memory 105. Ideally, all program code instructions and data that could be needed by an executing software thread are in main memory 105. Unfortunately, the sheer amount of program code and data that could be needed by all threads in the system far exceeds the capacity of main memory 105.

As such, "pages" of program code and data are called up from non volatile mass storage 108 and entered into main memory 105 as needed. Here, a software program generally understands how much main memory address space it has been allocated and what the content of the main memory space is. If additional program code and/or data that is expected to be used is not in main memory 105, the thread calls up one or more pages of the program code and/or data from mass storage 108 and enters the page(s) into main memory 105. If the software program was already using its main memory allocation to full capacity, it also swaps page(s) out of main memory 105 and writes them into mass storage 108 to make room in main memory 105 for the newly called up pages.

The movement of large amounts of information between main memory 105 and mass storage 108 corresponds to a significant inefficiency. In view of this inefficiency, referring to FIG. 2, some computer system designers have thought to put software execution resources into the mass storage devices themselves (e.g., solid state drives (SSDs)). Here, the idea is that program code can be executed locally with a processor 209 that is embedded within a mass storage device 207 (the "mass storage device processor", the "mass storage processor" or the like) so as to reduce the wasteful transfer of information between the mass storage device 207 and main memory 204. One or more mass storage devices can include a processor as indicated in FIG. 2.

A problem, however, is the existence of architectural differences between the mass storage processor 209 and the general purpose processing cores 201_1 through 201_N that are executing most of the system software.

Specifically, the mass storage processor 209 has at least one of the following characteristics: 1) a different or incompatible ISA than the ISA of the general purpose processing cores 201; 2) different local register structure and/or definition than the general purpose processing cores 201; 3) a different memory model than the general purpose processing cores 201 (the protocol and/or semantics by which a processor issues requests and receives responses from the memory it executes out of); 4) different memory access granularity than the general purpose processing cores (mass storage media can commonly only write at larger page or block granularities whereas general purpose processing cores can write to main memory at byte level granularity ("byte addressable") and/or make physical accesses to main memory at CPU cache line granularity); 5) no cache coherence with the general purpose processing cores 201; 6) does not execute program code out of main memory 204 (program code memory access instructions are not serviced from main memory (memory access read instructions do not fetch data from main memory, memory access write instructions do not write data to main memory).

Because of these differences it becomes very challenging if not impossible, whether pre-runtime (during compilation) or during runtime, to target any of a wide variety of different code regions for execution on the mass storage processor 209. Instead, at best, the mass storage processor 209 is limited to the role of a coarse grained accelerator.

That is, the mass storage processor 209 is limited to performing only a small set of coarse grained tasks that consume large numbers of cycles and are performed in isolation of the thread(s) that are executing on the general purpose cores 201. As such, the mass storage processor 209 cannot be tasked with the execution of any desired code region (whether statically assigned pre-runtime or dynamically assigned during runtime). Additionally, the mass storage processor 209 is not assigned fine grained tasks or tasks that require co-operation (frequent messaging and/or data exchanges) with the threads that execute on the general purpose cores 201. Thus, the mass storage processor 209 is relegated to the execution of only a few, time consuming tasks that operate on large data sets in isolation of the threads that are executing on the general purpose cores 201.

FIG. 3 shows an improved approach in which the mass storage processor 309 is essentially the same as (or otherwise compatible with for code execution purposes) the general purpose processor cores 301. Moreover, in various embodiments, the mass storage processor 309 is cache coherent with the general processing cores 301 and executes its program code out of main memory (no differently than the general purpose cores 301). In essence, the mass storage processor 309 is just another general purpose processor that has been added to the pool of general purpose processors 301 in the computing system.

By architecting the mass storage processor 309 to be just another general purpose processor in the system, the mass storage processor 309 is not restricted to the limited use cases of a mere accelerator. As such, ideally, any code region in a software program can be assigned for execution on the mass storage processor 309. Additionally, the decision to assign the mass storage processor 309 with a specific region of code for execution can be made statically pre-runtime (by a compiler) or dynamically during runtime based, e.g., on current software program or computing system state (e.g., power consumption). Moreover, the mass storage processor 309 can be assigned finer grained tasks that operate on smaller data sets and/or tasks that require co-operation (frequent messaging and/or data exchanges) with the threads that execute on the general purpose cores 301.

To elaborate, data items can be easily passed and/or shared between the mass storage processor 309 and any of the general purpose processing cores 301_1 through 301_N. The ease of passing and/or sharing of variables allows for frequent data exchanges and/or function calls as between the mass storage processor 309 and the general purpose processing cores 301 (e.g., over network 302). As such, the threads that are executing on the general purpose processing cores 301 can invoke the program code that is executing on the mass storage processor 309 with as much ease as they invoke each other's program code.

Ideally, therefore, the mass storage processor 309 can be tasked with the execution of any program code including program code that implements: 1) finer grained tasks that finish quickly and/or operate on smaller data items; 2) tasks that involve frequent messaging or data sharing/exchanges with threads that are executing on the general purpose processing cores 301. Additionally, the mass storage processor 309 can be assigned any/all accelerator like tasks (coarse grained, long completion time, isolated from other threads). Thus, the improved approach allows for almost unrestrained versatility of the application of the mass storage processor 309, the types of tasks it is asked to perform and/or the software program code region it is configured to execute.

In order to integrate the mass storage device processor 309 into the system as an additional general purpose processor, in various embodiments, the mass storage processor 309 includes some or all of the following characteristics: 1) a same or compatible ISA as the ISA of the general purpose processing cores 301; 2) same or sufficiently similar register structure and/or definition as the general purpose processing cores 301; 3) a same or sufficiently similar memory model as the general purpose processing cores 301; 4) same memory access granularity as the general purpose processing cores 301; 5) maintains cache coherence with the general purpose processing cores 301; 6) executes program code out of main memory.

With respect to the above characteristics, note that FIG. 3 depicts the mass storage processor 309 as being connected to the inter-processor network 302 that connects the general purpose processors 301 and having cache coherency protocol logic circuitry 312. Here, a cache coherence protocol (e.g., MESI) is understood to be executed over the network 302 so that the mass storage processor's internal (e.g., L1 and L2) and L3 cache 303 accesses are cache coherent with the general purpose processors 301.

Additionally, in various embodiments, like the general purpose processing cores 301, the mass storage processor 309 includes a translation look-aside buffer (TLB) that translates virtual memory addresses (that are explicitly called out by the memory access instructions of the program code that executes on the mass storage processor 309) to actual physical addresses in main memory. By so-doing, the software that is executed by the mass storage processor 309 can be allocated memory address space in main memory 304, and, the mass storage processor 309 is able to execute its program code directly out of main memory 304 no differently than the general purpose processing cores 301.

In further embodiments, as depicted in FIG. 3, the mass storage device 317 has a local memory 313 for the use of the mass storage processor 309. Importantly, in order to actually address the original problem of the inefficient movement of pages from mass storage to main memory and vice-versa (discussed above with respect to FIG. 1), in various embodiments, the local memory 313 is architecturally viewed as an extension to main memory 304. As such, application software program code regions or other programs that are configured for execution on the mass storage processor 309 are allocated to the physical address memory space of the mass storage processor's local main memory 313. With the cache coherency protocol logic circuitry 312, the mass storage processor's 309 local main memory 313 will be cache coherent with the (primary) main memory 304 of the computer system that the mass storage device 317 is plugged into.

Moreover, the mass storage resources that are allocated to these same programs are implemented with the non volatile storage media 314 (e.g., flash memory chips, hard disk drives) within the mass storage processor's mass storage device 317.

In this case, both the main memory and mass storage resources for the program code that executes on the mass storage processor 309 are self contained within the mass storage device 317. Such program code can therefore be constructed to maintain traditional page movements from mass storage to main memory and vice versa. However, such page movements will be kept internal to the mass storage device 317 thereby eliminating the page movement problem discussed above with respect to FIG. 1.

Thus, in a common configuration scenario, as application software, hypervisor/virtual machine monitor software or operating system software are allocated main memory and mass storage resources, a component of program code of these software instances is allocated to the main memory 313 and mass storage resources 314 of a particular mass storage device 317 for execution by the mass storage processor 309 of the mass storage device 317. The program code is written to take function calls from the threads of other processing cores including, e.g., any of the general purpose processing cores 301. When these function calls are invoked, commonly, they trigger operations to be performed by the mass storage processor 309 on data that is within the mass storage's main memory 313 and/or non volatile storage resources 314.

In a common example, most of the data to be operated on is in the mass storage device's non volatile storage resources 314. As such, the mass storage device 317 calls up the data as needed from the mass storage resources 314 (e.g., as pages) and enters it into the mass storage processor's local main memory 313. Thus, the threads that invoke the function call are written to invoke a call to a thread that is executing on a mass storage processor 309 whose corresponding mass storage device 317 keeps the data that is to be executed on.

Such invocations can be hard-coded into the software pre-runtime (during compilation) or soft-coded such that the decision to make the invocations are made during runtime based on the current system/software state. Additionally or in combination, hints can be inserted by a programmer or a compiler into the program code to help the code realize that an invocation to a mass storage processor might be appropriate (and where the final decision is made dynamically based on program/system state).

As discussed above, a wide variety of tasks can be implemented on the mass storage processor 309. Some possible examples include: database query operations, filtering data, checksum calculations to verify data integrity, data encryption, data compression, machine-learning operations, search operations, analytic operations such as computing min/max/averages of data stored on the mass storage device, etc.

Note that in systems having multiple mass storage devices each with a mass storage processor as described at length above, conceivably, program code executing on one mass storage processor can invoke program code executing on another mass storage processor. Such operation can lend itself, e.g., to large scale, peripherally distributed data computations.

Additionally, as indicated in FIG. 3, the mass storage device 317 can also be coupled to a peripheral control hub 306 to effect traditional mass storage device operation of the mass storage device as described above with respect to FIG. 1.

In some embodiments, the mass storage resources of the mass storage device are implemented with an emerging non volatile memory random access (NVRAM) technology. Emerging NVRAM technologies typically stack non volatile, resistive storage cells above the semiconductor chip substrate, e.g., amongst the interconnect wiring of the semiconductor chip. A first resistive state of the cell corresponds to a first stored logical value and a second resistive state corresponds to a second stored logical value. Examples of emerging NVRAM technologies include Optane™ memory from Intel Corporation and QuantX™ memory from Micron corporation. Underlying NVRAM cell technologies can be any of phase change, ferroelectric, magnetic, dielectric, spin torque transfer magnetic, etc. Importantly, at least certain types of NVRAM can support byte addressable accesses and therefore need not be limited to mass storage and instead can operate as main memory. In such embodiments, the local memory need not exist and the main memory address space can be assigned to NVRAM memory devices in the mass storage device (which could operate as a main memory extension).

FIG. 4 provides an exemplary depiction of a computing system 400 (e.g., a smartphone, a tablet computer, a laptop computer, a desktop computer, a server computer, etc.). As observed in FIG. 4, the basic computing system 400 may include a central processing unit 401 (which may include, e.g., a plurality of general-purpose processing cores 415_1 through 415_X) and the main memory controller 417 disposed on a multi-core processor or applications processor, main memory (also referred to as "system memory") 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors 409_1 through 409_Y, one or more cameras 410, a battery 411, a power management control unit 412, a speaker and microphone 413 and an audio coder/decoder 414.

An application processor or multi-core processor 450 may include one or more general-purpose processing cores 415 within its CPU 401, one or more graphical processing units 416, a memory management function 417 (e.g., a memory controller) and an I/O control function 418. The general-purpose processing cores 415 typically execute the system and application software of the computing system. The graphics processing unit 416 typically executes graphics intensive functions to, e.g., generate graphics information that is presented on the display 403. The memory control function 417 interfaces with the system memory 402 to write/read data to/from system memory 402.

System memory can be composed of volatile memory (e.g., dynamic random access memory (DRAM)), NVRAM or a combination thereof. Non volatile mass storage 420 can be composed of SSDs or other mass storage devices having a mass storage processor that acts as an additional general purpose processor as described at length above.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The power management control unit 412 generally controls the power consumption of the system 400.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
compiling a software program, the compiling comprising:
identifying a task that is to operate on certain data;
dividing the software program into different components including a component that includes the task, the component's program code to be stored in main memory; and,
targeting the component for execution on a processor within a mass storage device that is to keep the data, wherein, the processor within the mass storage device is also allocated main memory address space where the component's program code is stored so that the processor within the mass storage device is able to execute the component's program code from the main memory.

2. The method of claim 1 wherein at least one other of the different components includes a function call to the component to cause the component to execute the task.

3. The method of claim 2 further comprising embedding a hint in the software program's program code that causes the other component to consider targeting the component for execution on the processor within the mass storage device.

4. The method of claim 2 wherein a decision to invoke the component is made dynamically during runtime of the software program's program code.

5. A non-transitory machine readable storage medium containing program code that when processed by a computer causes a computer to perform a method, comprising:
compiling a software program, the compiling comprising:
identifying a task that is to operate on certain data;
dividing the software program into different components including a component that includes the task, the component's program code to be stored in main memory; and,
targeting the component for execution on a processor within a mass storage device that is to keep the data, wherein, the processor within the mass storage device is also allocated main memory address space where the component's program code is stored so that the processor within the mass storage device is able to execute the component's program code from the main memory.

6. The non-transitory machine readable storage medium of claim 5 wherein at least one other of the different components includes a function call to the component to cause the component to execute the task.

7. The non-transitory machine readable storage medium of claim 6 further comprising embedding a hint in the software program's program code that causes the other component to consider targeting the component for execution on the processor within the mass storage device.

8. The non-transitory machine readable storage medium of claim 5 wherein the processor within the mass storage device has a same instruction set architecture as general purpose processing cores of a computing system that the software program is to run on.

* * * * *